United States Patent [19]

Lyman

[11] Patent Number: 5,396,524
[45] Date of Patent: Mar. 7, 1995

[54] FLOW MEASUREMENT PROBE

[75] Inventor: Walter G. Lyman, Monroeville, Pa.

[73] Assignee: Westinghouse Electric Corporation, Pittsburgh, Pa.

[21] Appl. No.: 182,317

[22] Filed: Jan. 14, 1994

[51] Int. Cl.$^6$ .............................................. G21C 17/00
[52] U.S. Cl. ..................................... 376/246; 376/247
[58] Field of Search ................ 376/246, 247, 210, 215; 976/DIG. 215; 73/861, 708

[56] References Cited

U.S. PATENT DOCUMENTS

| | | | |
|---|---|---|---|
| 3,910,113 | 10/1975 | Brown | 73/212 |
| 3,993,539 | 11/1976 | Atherton et al. | 376/246 |
| 4,317,178 | 2/1982 | Head | 364/510 |
| 4,405,559 | 9/1983 | Tokarz | 376/247 |
| 4,574,643 | 3/1986 | Scott et al. | 73/861.04 |
| 4,735,100 | 4/1988 | Hajto | 73/861.66 |
| 4,788,867 | 12/1988 | Kishel | 73/722 |
| 4,842,806 | 6/1989 | Ohtomi | 376/247 |
| 5,118,461 | 6/1992 | Fujii | 376/246 |
| 5,228,346 | 7/1993 | King | 73/861 |

OTHER PUBLICATIONS

"Chemical Engineers' Handbook" Fourth Edition by John H. Perry, McGraw-Hill Book Company, published prior to 1985.

Primary Examiner—Daniel D. Wasil
Assistant Examiner—Meena Chelliah

[57] ABSTRACT

A flow measurement probe measures reactor coolant water flow in a cold leg pipe of a nuclear reactor system wherein a lack of elbows precludes the use of elbow tap flow measurements. An elongated probe body disposed in the pipe includes a common dynamic pressure tap in the peripheral wall of the probe body facing about into the direction of coolant water flow. A plurality of static pressure taps are oriented about normal to the direction of coolant water flow. Each of the static pressure taps is operatively connected witch one input of a different differential pressure transmitter. The other input of each of the transmitters is operatively connected with the common dynamic pressure tap. The differential pressure measured by each transmitter is proportional to the square of the magnitude of reactor coolant water flow. The multiple taps in the probe allow multiple redundant flow measurements to be made with a single device, thus avoiding the need for multiple penetrations in the pipe.

17 Claims, 2 Drawing Sheets

FLOW MEASUREMENT PROBE

GOVERNMENT CONTRACT

The government of the United States of America has rights in this invention pursuant to contract number DE-AC03-905F18495 awarded by the Department of Energy.

BACKGROUND OF THE INVENTION

1. Field of the Invention

This invention relates to fluid flow measurement probes and, more specifically, it relates to flow measurement probes capable of measuring reactor coolant water flow in a cold leg pipe of a nuclear reactor system wherein the lack of elbows in the cold leg pipe precludes the use of elbow taps for flow measurement.

2. Description of the Prior Art

Water cooled nuclear reactors typically have at least two "cold leg" pipes that each bring a large flow of coolant water to the reactor. The coolant water is typically fed into the reactor from the outlets of heat exchangers used for steam generation. It is important to monitor the flow of coolant water through these pipes. If the coolant water flow drops significantly, the coolant temperature in the reactor would rise and the reactor could overheat, thereby damaging the reactor and possibly releasing large amounts of radioactive material into the coolant water. Therefore, water cooled nuclear reactors are typically shut down when the coolant flow is reduced below a predetermined value, typically about 90 percent of the normal level of coolant flow.

Most prior art water cooled reactor systems have elbows in the cold leg pipes carrying coolant water. These systems typically employ elbow taps for measurement of coolant water flow. In this arrangement, one tap is provided on an inner curvature of the elbow and another tap on an outer curvature of the elbow. Due to the dynamics of fluid flow through pipe elbows, the pressure measured by the outer curvature tap is generally higher than that measured by the inner curvature tap, and the difference in pressure between the two locations is indicative of the magnitude of flow through the pipe. A differential pressure transmitter operatively connected to each of the taps provides a mechanism for monitoring the flow through that elbow. In prior art reactor systems, a plurality of elbow tap pairs, wherein each pair is operatively connected to a dedicated differential pressure transmitter, are used to provide redundant measurements of the coolant water flow. When at least two out of three or four signals indicate a low flow condition, a trip signal is generated to shut down the reactor.

The Westinghouse AP600 plant configuration differs from prior art reactor systems in that there are no elbows in the cold leg pipes where elbow taps could be installed. Elbow taps installed on a large radius curvature in a cold leg pipe would not provide sufficient differential pressure for an effective measurement. In the Westinghouse AP600 plant configuration, there are two cold leg pipes connected to each steam generator, so differential pressure measurement across the steam generator tube bundle would indicate total flow through the two cold leg pipes but would not indicate individual loop flows. Therefore, an alternative flow measurement capability is needed for new reactor systems, such as the AP600, that do not have elbows in the cold leg pipes.

SUMMARY OF THE INVENTION

According to the present invention, a probe adapted for use with a plurality of differential pressure transmitters for measuring the flow of a liquid in a pipe, such as, for example, reactor coolant water in a pipe extending into a nuclear reactor vessel from a source of coolant water, includes a probe body that extends from the wall of the pipe into the pipe interior. The probe body includes a common dynamic pressure tap oriented to face generally into the direction of flow, and a plurality of static pressure taps, each substantially angled away from the direction of the dynamic pressure tap. Each of the static pressure taps communicate with one of a like plurality of separate static pressure channels extending through the probe body for operatively connecting to a first input of one of the differential pressure transmitters. The common dynamic pressure tap communicates with a dynamic pressure channel extending through the probe body for operatively connecting to a second input of each of the differential pressure transmitters. Thus, each differential pressure transmitter senses the same dynamic pressure from the common dynamic pressure tap. However, each differential pressure transmitter senses a static pressure originating from a different one of the static pressure taps than that sensed by each of the other differential pressure transmitters. The difference between the dynamic pressure and the static pressure is proportional to the square of the magnitude of coolant water flow.

According to another aspect of the invention, the common dynamic pressure tap faces about into the direction of coolant water flow and each of the static pressure taps face about into a direction perpendicular to the direction of coolant water flow.

According to further aspects of the invention, the common dynamic pressure tap is located in a peripheral wall of the probe body. The static pressure taps can be located in an end wall of the probe body distal from the interior wall of the pipe, in the peripheral wall, or arranged such that some of the static pressure taps are located in the end wall and some are located in the peripheral wall.

This invention also provides a method for monitoring the flow of reactor coolant water in a pipe extending into a nuclear reactor vessel from a coolant source, such as provided by a cold leg outlet of a pressurized water steam generator. According to this method, a probe body, as described above, is placed in the pipe when the reactor is shut down and connections are made to the differential pressure transmitters. A base line, or initial flow value is determined for each differential pressure transmitter by measuring an initial differential pressure with each of the transmitters during operation of the reactor at a first time, preferably during plant start-up when the system is operating at normal temperature and with full flow in the system. The initial differential pressure readings from each of the transmitters is recorded or stored for future reference by, for example an electronic memory that can be included in a processor. During subsequent operation of the reactor system a second set of differential pressures is measured with the transmitters. The second set of differential pressures is compared by the processor with the initial set of differential pressures. The processor then provides a trigger signal according to a predetermined logic, such as when at least two individual differential pressures of the second set of differential pressures are less than a predetermined percentage of the initial differential pressures. The trigger signal can be used to actuate systems for reducing the power output of the reactor system, such as is commonly provided in nuclear reactor systems. An alarm may also be actuated by the processor to warn plant personnel of an abnormal or dangerous condition.

It is an object of this invention to provide a flow measurement probe that can be used in sections of piping having little or no curvature.

It is another object of this invention to provide a single flow measurement probe that is capable of providing redundant flow measurements.

It is another object of this invention to provide a method of monitoring the flow of coolant water in a nuclear reactor system.

It is another object of this invention to accomplish the elbow tap flow measurement functions in a water cooled nuclear reactor system with only a single penetration in a cold leg pipe.

These and other objects of the present invention will be more fully understood from the following description of the invention with reference to the illustrations appended hereto.

DESCRIPTION OF THE PREFERRED EMBODIMENTS

Figure 1:
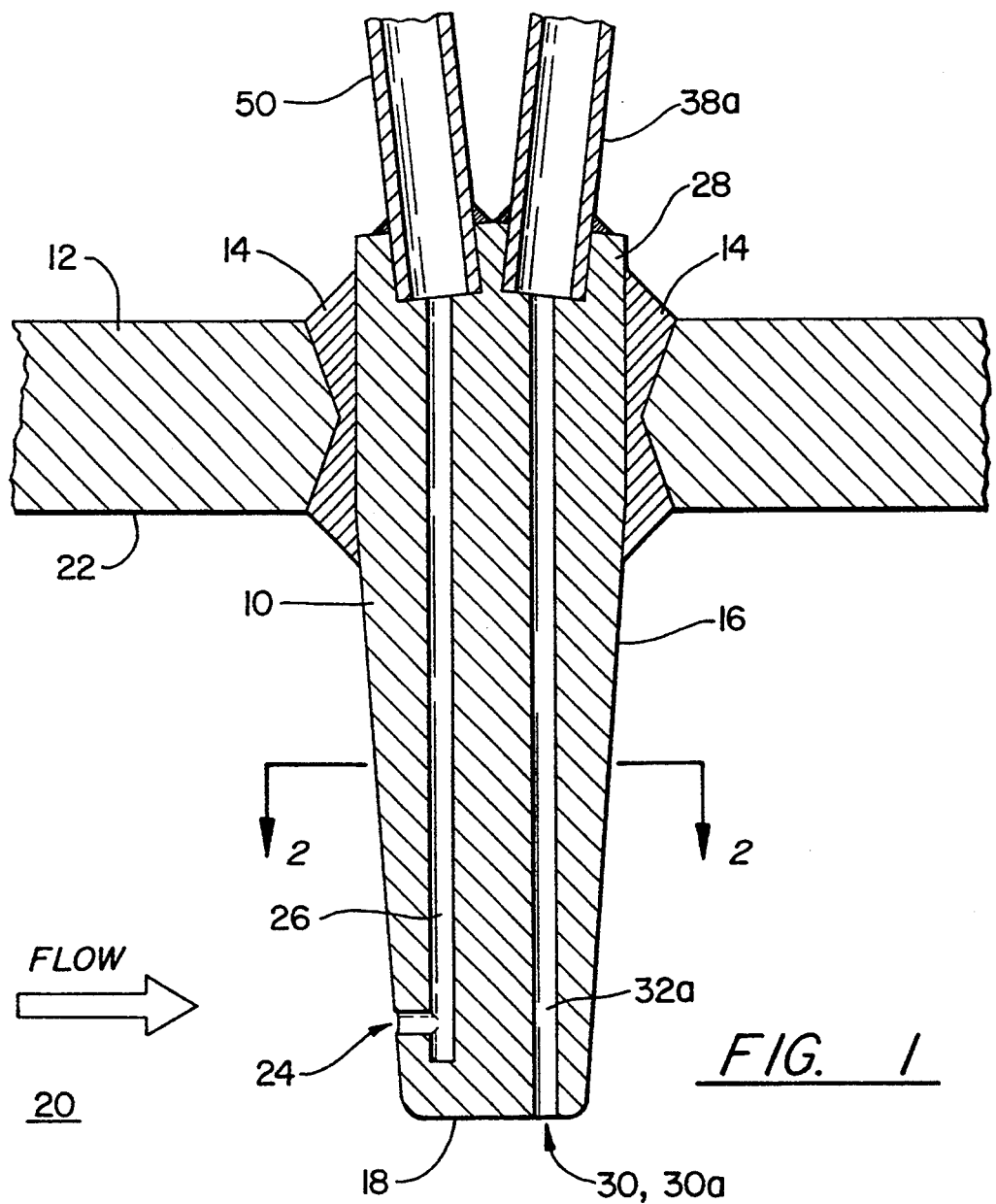
FIG. 1 is a longitudinal sectional view of the flow probe of this invention that is set in place in a nuclear reactor coolant system pipe.
Figure 2:
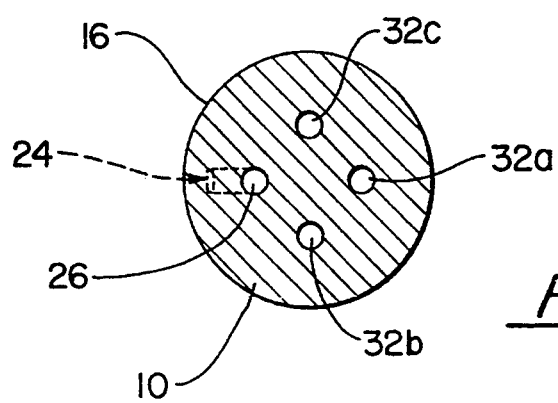
FIG. 2 is a section taken through line 2—2 of FIG. 1.

Referring now to FIGS. 1 and 2, a preferred embodiment of a flow measurement probe of the present invention is shown in longitudinal cross section emplaced in a section of a cold leg pipe of a reactor coolant system. Normally, one probe would be emplaced in each cold leg pipe. The direction of coolant water flow is indicated by an arrow. The probe body 10 is preferably an elongated member, extending about perpendicular to the flow, that is fabricated of stainless steel and welded to the stainless steel cold leg pipe 12 at weld 14. The probe body 10 has a peripheral wall 16 and an end wall 18 extending into the interior 20 of the pipe 12. The two cold leg pipes connecting the steam generator (not shown) to the reactor vessel (not shown) for the Westinghouse AP600 reactor systems each have about a 28 inch inner diameter, and the probe body for that application preferably extends about 4 inches (10.2 cm) into the pipe interior and is about 1.5 inches (3.8 cm) in diameter at the end wall 18. Thus, the end wall 18 of the probe body 10 extends sufficiently deeply into the cold leg pipe interior 20 to avoid boundary effects of the pipe wall 22 on the coolant water flow. It is to be understood that other reactor systems having cold leg pipes of different sizes may require a different penetration length and a different diameter probe body..

A single, common dynamic pressure tap 24 in the peripheral wall 16 of the probe body faces about into the direction of coolant water flow and connects to a dynamic pressure bore 26 extending longitudinally to a second end 28 of the probe body that is located outside the pipe 12. A plurality of static pressure taps 30, preferably three or four, are located such that they are each oriented about normal to the direction of coolant water flow. In the embodiment illustrated in FIGS. 1 and 2, each of three static pressure taps 30a,b,c is located in the end wall 18. However, it is understood that one or more of the static pressure taps 30a,b,c may be equivalently located in the peripheral wall 16 of the probe body 10. Each of the static pressure taps 30a,b,c is connected to a static pressure bore 32a,b,c extending to the second end 28 of the probe body 10. The dynamic pressure bore 26 is preferably 0.25 inches (0.635 cm) in diameter. The static pressure bores 32a,b,c are each preferably 0.187 inches (0.476 cm) in diameter.

Figure 3:
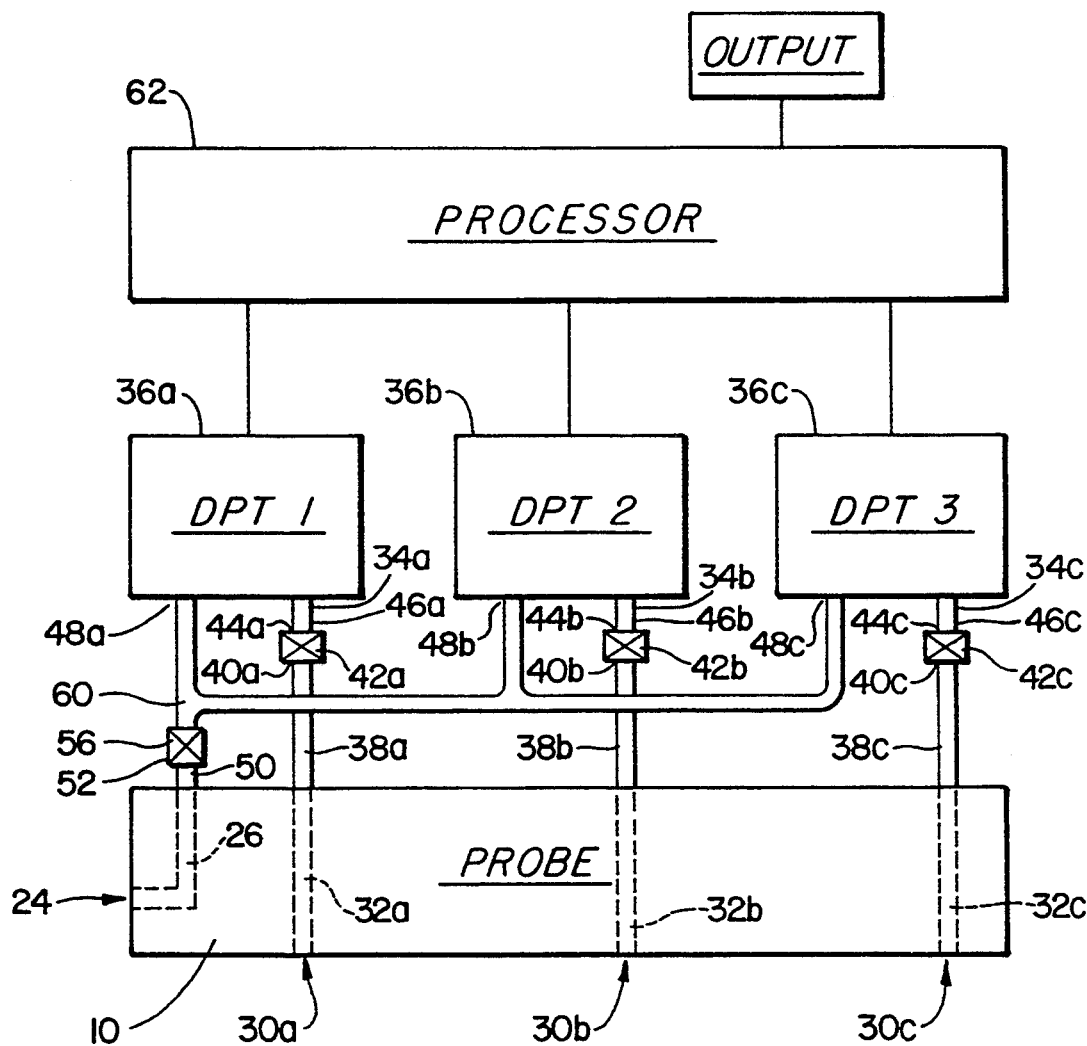
FIG. 3 is a schematic illustrating the operative connections between a flow measurement probe of this invention and the associated differential pressure transmitters and a processor.

Each of the bores 32a,b,c for the static pressure taps 30a,b,c is operatively connected to a first input 34a,b,c of a differential pressure transmitter 36a,b,c, (labeled DPT 1-3) as schematically illustrated in FIG. 3. In this preferred embodiment, a nominal ¾ inch (1.91 cm) connecting pipe 38a,b,c is welded to each bore 32a,b,c and connects to a first port 40a,b,c of a valve 42a,b,c which may be closed for maintenance of the system. The other port 44a,b,c of each valve 42a,b,c is connected to a section of instrument tubing 46a,b,c connected to the first input 34a,b,c of one of the differential pressure transmitters 36a,b,c. The second input 48a,b,c of each of the differential pressure transmitters 36a,b,c is operatively connected, using connections similar to those used for the static pressure taps, to the common dynamic pressure tap 24. A nominal ¾ inch (1.91 cm) stainless steel connecting pipe 50 that is welded to the dynamic pressure tap bore 26 at the second end 28 of the probe body 10 connects to a first port 52 of a valve 56 that is in turn connected to the second input 48a,b,c of each transmitter 36a,b,c with instrument tubing 60 having multiple branches. Thus, each of the redundant differential pressure transmitters 36a,b,c utilizes the common dynamic pressure tap 24 for one of its inputs 48a,b,c and a different one of the static pressure taps 30a,b,c for its other input 34a,b,c. It is desirable to streamline the peripheral surface of the probe body and shape the end wall of the probe to reduce turbulence around the static pressure taps. Reduction of turbulence at the static pressure taps will help to reduce fluctuations in the flow measurements. Such shaping of the probe body is a design choice capable of optimization by those skilled in the art.

Each of the differential pressure transmitters 36a,b,c senses a differential pressure that is proportional to the square of the magnitude of flow of reactor coolant water. One type of differential pressure transmitter suitable for this application is the Barton model No. 752, which is capable of measuring differential pressures of up to 500 inches of water (934 mm Hg). Each transmitter 36a,b,c preferably sends a signal indicative of the differential pressure to a processor 62 (see FIG. 3). The processor 72 may convert the signal to a flow signal that is proportional to the absolute flow rate. The processor compares the flow signal from each transmitter to one of a set of initial values stored in its memory. Each of the initial values corresponds to the magnitude of flow measured at an earlier time by one of the transmitters during, for example, plant start-up when the reactor system is operating at normal temperature and with full flow of coolant through the cold leg pipe. As with the elbow tap measurements used in prior art systems, a trigger signal may be output from the processor according to a predetermined logic. For example, the processor may output the trigger signal if a predetermined number of the flow signals, such as two of three or two of four, fall below a trip set point that is a predetermined percentage of the corresponding initial value. The trigger signal can be used to activate emergency systems commonly found in nuclear power plants.

The common dynamic pressure tap does not compromise redundancy of the low flow trip. A failure of the dynamic pressure sensing line would result in a low flow indication for all transmitters, while a failure of an individual static pressure sensing line would result in a high flow indication in only one transmitter. The logic system normally will enable continued operation if one of the static pressure lines or one of the differential pressure transmitters is inoperable. However, the logic for determining when to output a trigger signal would be different under those circumstances.

The dynamic head measurement described above performs the same function as the elbow tap measurement currently being used. The measurement provides a signal which is proportional to the square of the magnitude of the flow rate. The initial, or calibration, values used by the processor is measured at plant start up when the system is operating at normal temperature with full flow in the system. The measured calibration value would then correspond to one hundred percent flow for comparison purposes. The trip set point: would be set at the differential pressure corresponding to the trip flow rate, preferably 90%. As currently practiced, the absolute value of the flow rate would be determined from another measurement, such as a calorimetric flow measurement that is well known in the art. Therefore, the flow measurement probe needs only to be calibrated to a relative, or normalized flow.

It will be understood by those skilled in the art that the processor may utilize differential pressure signals transmitted by each of the transmitters that are proportional to the square of the magnitude of the flow, or the invention may equivalently obtain the square root of those signals to produce signals that are directly proportional to the magnitude of the flow. This step may be provided by the processor or by other methods well known in the art.

It will be appreciated, therefore, that the present invention performs the elbow tap flow measurement functions with only a single penetration in each of the cold leg pipes. This is accomplished in a reliable, economical and efficient manner.

Whereas particular embodiments of the present invention have been described above for purposes of illustration, it will be appreciated by those skilled in the art that numerous variations of the details may be made without departing from the invention as described in the appended claims.

I claim:

1. A flow probe adapted for use with a plurality of differential pressure transmitters for measuring the flow of a liquid in a pipe, comprising a probe body disposed in the pipe, the probe body including:
   a common dynamic pressure tap oriented generally into the direction of flow;
   a plurality of static pressure taps, each substantially angled away from the direction of the dynamic pressure tap;
   a plurality of non-communicating static pressure channel means extending through the probe body, each for operatively connecting one of the static pressure taps to a first input of one of the differential pressure transmitters; and
   dynamic pressure channel means extending through the probe body for operatively connecting the dynamic pressure tap to a second input of each of the differential pressure transmitters.

2. The flow probe of claim 1, wherein the probe body further includes a peripheral wall and an end wall, and characterized in that the dynamic pressure tap is in the peripheral wall.

3. The flow probe of claim 2, wherein at least one of the static pressure taps is in the end wall.

4. The flow probe of claim 2, wherein each of the static pressure taps are in the end wall.

5. The flow probe of claim 2, wherein at least one of the static pressure taps is in the peripheral wall.

6. The flow probe of claim 2, wherein each of the static pressure taps are in the peripheral wall.

7. The flow probe of claim 2, characterized in that the dynamic pressure tap is oriented about into the direction of flow, and each of the static pressure taps is oriented about normal to the direction of flow.

8. The flow probe of claim 7, wherein at least one of the static pressure taps is in the end wall.

9. The flow probe of claim 7, wherein each of the static pressure taps are in the end wall.

10. The flow probe of claim 7, wherein at least one of the static pressure taps is in the peripheral wall.

11. The flow probe of claim 7, wherein each of the static pressure taps are in the peripheral wall.

12. A method for measuring reactor coolant water flow in a water cooled nuclear reactor system that includes a pipe extending into a nuclear reactor vessel from a coolant water source, comprising the steps of:
   providing a probe characterized by a probe body that includes a peripheral wall, an end wall at a first end, a second end opposite the first end, a common dynamic pressure tap in the peripheral wall, dynamic pressure channel means for operably connecting the common dynamic pressure tap with a first input of each of a plurality of differential pressure transmitters, a plurality of static pressure taps, each substantially angled away from the direction of the dynamic pressure tap, and a plurality of static pressure channel means each for operatively connecting one of the plurality of static pressure taps to a second input of a separate one of the transmitters;
   mounting the probe body in the pipe such that the common dynamic pressure tap and the plurality of static pressure taps are interior the pipe, the second end is exterior the pipe and the common dynamic pressure tap is oriented about into the direction of flow of coolant water;
   operatively connecting the common dynamic pressure tap to the transmitters with the first channel means;
   operatively connecting each of the static pressure taps to a separate one the transmitters with the second channel means;
   then flowing the coolant water in the pipe at a first time;
   then sensing a differential pressure with each of the transmitters; and
   providing from each of the transmitters a differential pressure signal indicative of the differential pressure at the first time.

13. A flow probe for measuring a flow of reactor coolant water in a pipe extending into a nuclear reactor vessel from a coolant water source, comprising:
   a plurality of differential pressure transmitters;
   an elongated probe body, characterized by a peripheral wall positioned interior the pipe, a first end positioned interior the pipe, a second end opposite the first end positioned exterior the pipe, a common dynamic pressure tap in the peripheral wall oriented about into the direction of flow, a plurality of spaced apart static pressure taps, each oriented about normal to the direction of flow, a plurality of static pressure bores each operatively connecting one of the plurality of static pressure taps to a first input of a different one of the plurality of differential pressure transmitters, and a dynamic pressure bore operatively connecting the dynamic pressure tap with a second input of each of the plurality of differential pressure transmitters.

14. The probe of claim 11, wherein at least one of the static pressure taps is in an end wall at the first end.

15. The probe of claim 11, wherein each of the static pressure taps are in an end wall at the first end.

16. The probe of claim 11, wherein at least one of the static pressure taps is in the peripheral wall.

17. The probe of claim 11, wherein each of the static pressure taps are in the peripheral wall.

* * * * *